US011310714B1

(12) United States Patent
Marupaduga

(10) Patent No.: US 11,310,714 B1
(45) Date of Patent: Apr. 19, 2022

(54) LOAD BALANCING BASED ON PAIRING EFFICIENCY

(71) Applicant: Sprint Spectrum LP, Overland Park, KS (US)

(72) Inventor: Sreekar Marupaduga, Overland Park, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

(21) Appl. No.: 16/832,728

(22) Filed: Mar. 27, 2020

(51) Int. Cl.
*H04W 4/00* (2018.01)
*H04W 36/22* (2009.01)
*H04W 36/06* (2009.01)
*H04W 36/38* (2009.01)
*H04W 52/14* (2009.01)
*H04W 88/10* (2009.01)

(52) U.S. Cl.
CPC .......... *H04W 36/22* (2013.01); *H04W 36/06* (2013.01); *H04W 36/38* (2013.01); *H04W 52/143* (2013.01); *H04W 88/10* (2013.01)

(58) Field of Classification Search
USPC ........ 370/328, 329, 330, 331, 230; 375/267; 455/452.2, 524
See application file for complete search history.

(56) References Cited

U.S. PATENT DOCUMENTS

| 8,139,519 | B2 | | 3/2012 | Ahn et al. | |
|---|---|---|---|---|---|
| 10,063,292 | B2 | | 8/2018 | Hirsch et al. | |
| 10,070,454 | B2 | | 9/2018 | Elsherif et al. | |
| 10,194,446 | B2 | * | 1/2019 | Gholmieh | H04W 72/08 |
| 10,779,198 | B1 | * | 9/2020 | Oroskar | H04W 36/00837 |
| 2006/0034382 | A1 | * | 2/2006 | Ozluturk | H04W 52/262 |
| | | | | | 375/267 |
| 2009/0323637 | A1 | * | 12/2009 | Kashiwase | H04W 52/42 |
| | | | | | 370/331 |
| 2010/0298005 | A1 | * | 11/2010 | Yavuz | H04W 36/20 |
| | | | | | 455/452.2 |
| 2013/0100880 | A1 | * | 4/2013 | Moren | H04W 52/367 |
| | | | | | 370/328 |
| 2015/0208420 | A1 | * | 7/2015 | Kashiwase | H04W 36/0069 |
| | | | | | 370/230 |
| 2015/0257110 | A1 | * | 9/2015 | Chen | H04W 52/241 |
| | | | | | 375/259 |
| 2016/0285679 | A1 | * | 9/2016 | Dudda | H04W 36/0058 |
| 2017/0086119 | A1 | * | 3/2017 | Xu | H04W 36/30 |
| 2017/0374607 | A1 | * | 12/2017 | Wu | H04W 88/10 |
| 2019/0239168 | A1 | * | 8/2019 | Li | H04W 52/14 |
| 2019/0349974 | A1 | * | 11/2019 | Sundararajan | H04W 72/1268 |
| 2020/0343945 | A1 | * | 10/2020 | Stephenne | H04B 7/0452 |

* cited by examiner

*Primary Examiner* — David Q Nguyen

(57) ABSTRACT

Load balancing based on pairing efficiency includes monitoring a pairing efficiency metric of each carrier deployed by an access node, the access node being configured to utilize 5G EN-DC, and offloading wireless devices from a first carrier having a lower pairing efficiency to a second carrier having a higher pairing efficiency. Offloading includes adjusting reference signals associated with 4G and 5G carriers.

15 Claims, 5 Drawing Sheets

LOAD BALANCING BASED ON PAIRING EFFICIENCY

TECHNICAL BACKGROUND

As wireless networks evolve and grow, there are ongoing challenges in providing high-quality service to increasing numbers of wireless devices in various coverage areas of a wireless network. Different wireless devices are configured to use different types of applications (such as voice over IP, streaming, gaming, etc.), and each different application may optimally function with a different channel size or bandwidth. Further, radio access technologies (RATs) such as 5G New Radio (NR) are being implemented alongside existing RATs such as 3G and 4G Long Term Evolution (LTE), and wireless devices are increasingly becoming more capable of connecting to these RATs. While channel bandwidths in 4G are static, 5G is capable of deploying various different bandwidths, most of which are higher than 4G bandwidths. Further, "Dual Connectivity" refers to the ability for wireless devices to attach to two or more access nodes and transmit/receive information via two wireless connections simultaneously. In exemplary situations, dual connectivity can include E-UTRAN-NR Dual Connectivity (EN-DC), which uses both 4G and 5G RATs. For example, a wireless device capable of dual connectivity can attach to both 4G and 5G RATs, using the 4G RAT for control transmissions, while using the 5G RAT for data transmissions. Using the 5G RAT for data transmissions is advantageous, as 5G provides higher bandwidths and frequencies versus 4G.

Further, wireless networks may be configured to utilize multiple-input-multiple-output (MIMO), in which multiple data streams can be directed towards one or more eligible wireless devices via various combinations of antennae and transceivers based on the orthogonality of transmission, thereby maximizing resources. MIMO can include single-user MIMO (SU-MIMO), multi-user MIMO (MU-MIMO), and massive MIMO (mMIMO), which extends MU-MIMO to antenna arrays coupled to base stations, the antenna arrays comprising large numbers of controllable antenna elements that enable directing several MU-MIMO streams to various groups or "pairings" of wireless devices. MIMO has been identified as one of the promising air interface technologies to address the capacity requirement required demanded by 5G networks. However, MIMO has also been used to improve network capacity and throughput in legacy 4G networks. In general, MIMO works better with higher frequencies, since denser amounts of data can be transmitted in multiple layers using the same frequency resources. Thus, wireless devices that satisfy certain requirements (i.e. pairing criteria) can be configured to receive MU-MIMO streams using the same air-interface resources.

However, there are considerations regarding how to optimally communicate between an access node comprising a plurality of antenna elements utilizing different bandwidths or RATs, and wireless devices with different capabilities and requirements. For example, as increasing amounts of data are being transmitted to wireless devices (e.g. multimedia content, live streams, etc.), resources such as physical resource blocks in channels may become scarce. While MIMO increases efficiency of existing air-interface resources such as physical resource blocks (due to, for example, orthogonality of transmission), wireless devices that do not use or otherwise qualify for MIMO transmissions may use excessive amounts of resources. Further, when a particular carrier (e.g. a 4G carrier or a 5G carrier is heavily loaded, it becomes more imperative to use MIMO to increase efficiency.

OVERVIEW

Exemplary embodiments described herein include methods, systems, and processing nodes for load balancing based on pairing efficiency. An exemplary method for load balancing based on pairing efficiency includes comparing a pairing efficiency metric of different carriers within a wireless sector, and based on the comparing, triggering handovers of wireless devices from one carrier to another carrier.

An exemplary system for load balancing based on pairing efficiency includes an access node configured to deploy at least two carriers, and a processing node coupled to the access node, the processing node being configured to perform operations including monitoring a pairing efficiency metric of each carrier, and offloading wireless devices from a first carrier having a lower pairing efficiency to a second carrier having a higher pairing efficiency.

An exemplary processing node for load balancing based on pairing efficiency is configured to perform operations including comparing a pairing efficiency metric of different carriers within a wireless sector, and based on the comparing, triggering handovers of wireless devices from one carrier to another carrier.

DETAILED DESCRIPTION

Figure 1:
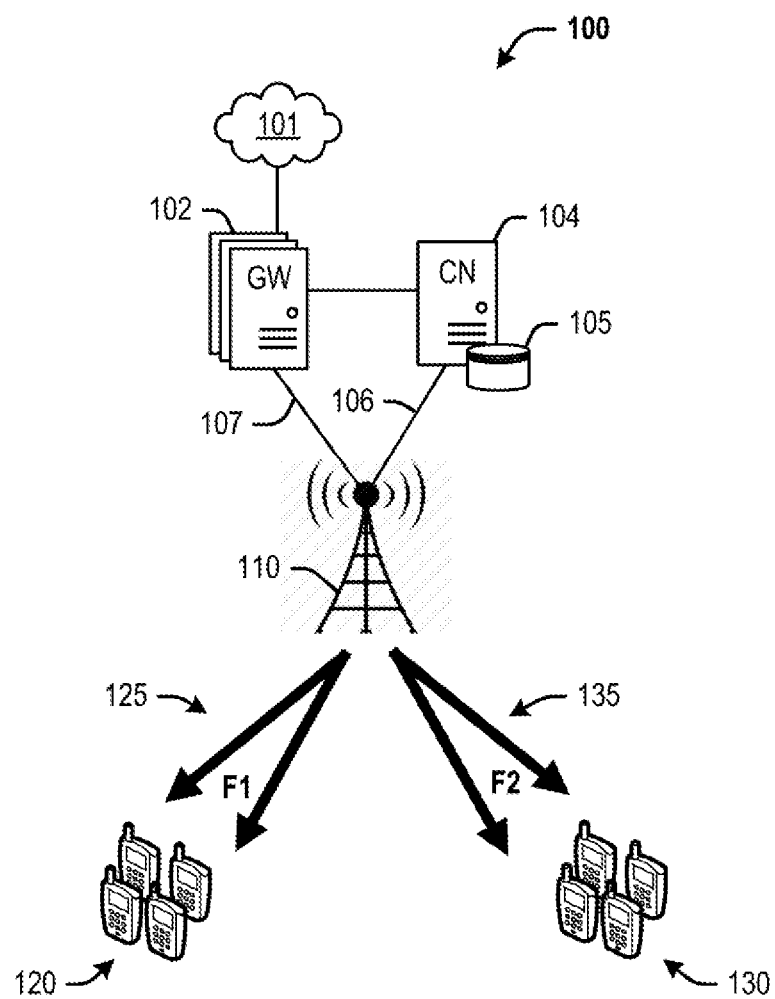
FIG. 1 depicts an exemplary system for load balancing based on pairing efficiency.

The following disclosure presents methods and systems for triggering handovers of wireless devices across different carriers based on a MIMO pairing efficiency metric associated with each different carrier. The operations described herein may be performed by processing nodes and/or access nodes configured to communicate over a plurality of channel sizes and/or RATs. For example, the access node can include a combination of a 4G eNodeB and a 5G gNodeB. In other words, the access node can comprise transceivers that are configured to communicate using 4G LTE as well as transceivers that are configured to communicate using 5G NR. Further, the access node can include a plurality of antennae (or antenna elements), a portion of which is configured to deploy a first bandwidth or RAT (e.g. 4G LTE), and a portion of which is configured to deploy a second bandwidth or RAT (e.g. 5G NR). In addition, in 5G EN-DC systems, control transmissions continue to utilize the non-dedicated 4G antenna elements, reserving the 5G antenna elements for data communication (i.e. payloads, etc.) with the wireless devices meeting the criteria. Generally, 5G NR utilizes larger channel bandwidths and frequencies than 4G LTE.

Thus, transmitting data information such as MU-MIMO streams using the second RAT (e.g. 5G) can be beneficial to network operation by, for instance, improving throughput, while transmitting control and/or signaling information using the first RAT (e.g. 4G) can be beneficial by, for instance, utilizing ubiquitous existing infrastructure for performing signaling operations, since dedicating a high-bandwidth portion of antenna ports provides more spectral efficiency. However, when the load on the 5G carrier is high (as in, meets or exceeds a threshold load), and if the pairing efficiency on the 4G carrier is higher than that on the 5G carrier, then wireless devices may be offloaded to the 4G carrier.

The pairing efficiency may be based on a ratio of a number of wireless devices qualifying for MIMO versus a total number of wireless devices attached to the access node, and can include current, historical, or predicted trends. In particular, for access nodes configured with 5G EN-DC (dual connectivity with 5G and 4G carriers), the pairing efficiency is determined for each different carrier. If the pairing efficiency for one carrier is higher than for another carrier (based on, for instance, the number of wireless devices qualifying for MU-MIMO pairing in each carrier, or other metrics as identified below), then load balancing is performed between the carriers. In particular, handovers are triggered of wireless devices from a carrier having a low pairing efficiency to a carrier having a high pairing efficiency. Consequently, resources consumption of the carrier having the low pairing efficiency is mitigated. In an exemplary embodiment, a load on each carrier may be considered prior to performing the disclosed operations. For example, if the load of one of the 4G or 5G carriers exceeds a threshold, then the pairing efficiency is monitored for both carriers, and the load balancing is performed based thereon. Further, the load balancing can include adjusting reference signal transmit power levels associated with each carrier, and the operations may be performed at configurable time periods, enabling load to equalize or settle in between adjustments.

Thus, as described herein, the access node (and/or processing node communicatively coupled thereto) can be configured to perform operations including comparing a pairing efficiency metric of different carriers within a wireless sector, and based on the comparing, triggering handovers of wireless devices from one carrier to another carrier. Alternatively, or in addition, the operations can include monitoring a pairing efficiency metric of each carrier, and offloading wireless devices from a first carrier having a lower pairing efficiency to a second carrier having a higher pairing efficiency. These and other embodiments are further described herein and with reference to FIGS. 1-6 below.

FIG. 1 depicts an exemplary system 100 comprising a communication network 101, gateway 102, controller node 104, access node 110, and wireless devices 120 and 130. In this exemplary embodiment, access node 110 may be configured to deploy carriers using at least two RATs (i.e. wireless air interfaces), e.g. a 4G LTE wireless air interface, and a 5G NR wireless air interface. Each RAT may be configured to utilize a different frequency band or sub-band, a different channel size or bandwidth, and so on. For example, the 5G NR carrier may be configured to utilize higher frequencies and larger channel bandwidths than the 4G LTE carrier. For example, the 5G NR wireless air interface may utilize a first one or more frequency bands referred to here as F1, and the 4G LTE wireless air interface may utilize a second one or more frequency bands referred to here as F2. Further, access node 110 can be configured to communicate using both RATs at the same time. For example, access node 110 can comprise antennae that are configured to communicate with wireless devices 120 via the 5G wireless air interface using frequencies F1 and with wireless devices 130 via the 4G wireless air interface using frequencies F2. In an exemplary embodiment, access node 110 is configured to utilize 5G EN-DC, dual connections are initiated with wireless devices 120 using both 4G and 5G carriers, the 4G carrier being used to transmit control information, and the 5G carrier being used to transmit data information. For example, a processing node within system 100 (for example, communicatively coupled to access node 110, controller node 104, or any other network node) can be configured to determine whether or not wireless devices 120, 130 are capable of communicating using both RATs, and instruct the access node 110 to broadcast an indicator in, for example, a system information message. For example, access node 110 may use the 4G carrier to control and set up a dual connectivity session with wireless devices 120. In other words, control information (including SIB messages) is transmitted from the access node 110 using the 4G carrier, while the 5G carrier is utilized for transmission of data. For example, as shown herein, wireless devices 120 are illustrated as receiving a MU-MIMO data stream 125 using frequencies F1, wherein it is implied that control signaling that enables MU-MIMO data stream 125 is configured to use 4G frequencies F2. Further, access node 110 can also be configured to deploy MU-MIMO data stream 135 on the 4G carrier using frequencies F2. Further, in other embodiments, access node 110 can be among a plurality of access nodes, with various carriers deployed therefrom, as may be evident to those having ordinary skill in the art in light of this disclosure.

Further, the processing node may be configured to perform operations including comparing a pairing efficiency metric of each carrier, and based on the comparing, triggering handovers of wireless devices 120, 130 from one carrier to another carrier. Triggering handovers can be based on adjusting a reference signal transmit power associated with each different carrier. Further, the pairing efficiency metric may be based on any combination of an orthogonality associated with each of wireless devices 120, 130 an angular separation required for MIMO pairing for each of wireless devices 120, 130, a threshold data buffer requirement of a buffer on access node 110, or a number of wireless devices from among each of wireless devices 120, 130 that is eligible to join a MU-MIMO group. For example, being eligible for MU-MIMO (or "qualifying" for MU-MIMO) may be based on, for instance, an orthogonality of transmission (in other words, angular separation), so as to maximize resources of a loaded access node, as well as a total number of wireless devices allowed per MIMO group, or a size of a buffer on access node 110. One or more criteria for wireless devices to qualify for MIMO (or adding wireless devices into an existing MIMO group) include a channel orthogonality (i.e., non-overlapping and non-interfering channels) above a set threshold, which may be achieved by assigning cyclic shifts allocated to, for example, a Demodulation Reference Signal ("DM-RS") to differentiate parallel data streams, as well as having a SINR above a threshold. Qualifying wireless devices may have an assigned precoder that is orthogonal to other qualifying wireless devices. In an exemplary embodiment, downlink transmission schemes of access node 110 (and/or other access nodes not shown herein) may be supported at a physical layer by a set of downlink reference signals. These reference signals can be specific to wireless devices 120, 130, i.e., DM-RS, or specific to geographical areas of access node 110, i.e., Common Reference Signals ("CRS"). DM-RS' are pre-coded signals used for demodulation purposes on scheduled PRBs. For example, a pre-coding module of access node 110 may apply pre-coding to data transmissions targeted to wireless devices 120, 130 based on channel feedback received from said wireless devices including RI, CQI, and PMI. CRS' are not pre-coded signals and are used by wireless devices 120, 130 for channel estimation. To fully exploit MU-MIMO mode, data/spatial streams intended to/from access node 110 and/or wireless devices 120, 130 need to be well separated and orthogonal at both Tx/Rx sides. Optimal pre-coding for MU-MIMO mode at, for example, a pre-coding module of access node 110, may include Dirty Paper Coding ("DPC") combined with user scheduling and power loading. Additional pre-coding techniques may include Channel Inversion ("CI"), e.g., to cancel interference, and/or Regularized Channel Inversion ("RCI"), e.g., to attenuate interference.

As shown in FIG. 1, wireless devices 120 appear to be eligible for and participating in a MIMO stream 125 using frequencies F1, and wireless devices 130 appear to be eligible for and participating in a MIMO stream 135 using frequencies F1. The pairing efficiency metric for each carrier can be based on performance of MIMO streams 125, 135, or any other criteria associated with each of wireless devices 120, 130. For example, the pairing efficiency metric can be based on one or more of a size of each MIMO group comprising the eligible wireless devices 120, 130, a quantity of eligible wireless devices participating in the MIMO groups, a percentage of total wireless devices attached to the access node 110 (including but not limited to wireless devices 120, 130), a throughput of each of the one or more MIMO groups in the sector, an average throughput of each MIMO group or each wireless device in each MIMO group, or an aggregate throughput (i.e. total throughput) of all MIMO signals within the sector (including but not limited to MIMO signals 125, 135). Performance metrics and/or pairing efficiency can further be based on historical and/or current information related to a quantity of successful pairings, trends of the signal characteristics, and so on. For example, the historical trends may be monitored and recorded at time intervals, and the pairing efficiency based on the recorded historical trends. Thus, at certain time intervals, the pairing efficiency is monitored when adjusting the MIMO criteria as described herein. Generally, the pairing efficiency tracks how successfully and efficiently the MIMO groups are utilizing the available resources. In an exemplary embodiment, the pairing efficiency metric is based on a ratio of a number of wireless devices qualifying for MU-MIMO versus a total number of wireless devices attached to the access node. In other words, the pairing efficiency metric is based on a percentage quantity of wireless devices in each carrier that are eligible to join or form the MU-MIMO groups.

Thus, when the pairing efficiency metric of a carrier (e.g. the 4G carrier using frequencies F2) is higher than the pairing efficiency metric of another carrier (e.g. the 5G carrier using frequencies F1), handovers can be triggered of wireless devices from the 5G carrier to the 4G carrier. The resulting reduction in wireless devices in the 5G carrier frees up air interface resources (such as physical resource blocks) that would otherwise be used by wireless devices that were unable to participate in MIMO. Whereas, the increase in wireless devices in the 4G carrier would not negatively impact the amount of resources in the 4G wireless air interface, because more wireless devices are able to use the same physical resource blocks (due to orthogonality), based on the higher pairing efficiency. Further, triggering handovers of wireless devices from the 5G carrier to the 4G carrier can be based on adjusting reference signal transmit powers of reference signals associated with each carrier. For example, upon increasing a reference signal transmit power of the 4G carrier and/or reducing a reference signal transmit power of the 5G carrier, wireless devices measuring both reference signals can request handovers to the 4G carrier. Further in exemplary embodiments, when the wireless devices are attached to both carriers using dual connectivity, the handover may be seamless, and wireless devices can simply detach from the 5G carrier and begin receiving data transmissions via the 4G carrier.

Further, when the pairing efficiency metric of the other carrier (e.g. the 5G carrier using frequencies F1) is higher than the pairing efficiency metric of the 4G carrier, handovers can be triggered of wireless devices from the 4G carrier to the 5G carrier. The resulting reduction in wireless devices in the 4G carrier frees up air interface resources (such as physical resource blocks) that would otherwise be used by wireless devices that were unable to participate in MIMO. Whereas, the increase in wireless devices in the 5G carrier would not negatively impact the amount of resources in the 5G wireless air interface, because more wireless devices are able to use the same physical resource blocks (due to orthogonality), based on the higher pairing efficiency. Further, triggering handovers of wireless devices from the 4G carrier to the 5G carrier can be based on adjusting reference signal transmit powers of reference signals associated with each carrier. For example, upon increasing a reference signal transmit power of the 5G carrier and/or reducing a reference signal transmit power of the 4G carrier, wireless devices measuring both reference signals can request handovers to the 5G carrier. Further in exemplary embodiments, when the wireless devices are attached to both carriers using dual connectivity, the handover may be seamless, remain connected to the 4G carrier for control signaling, and attach to the 5G carrier to begin receiving data via frequencies F1.

Further in an exemplary embodiment, a total power output of each carrier may be used in determining whether or not to offload wireless devices from one carrier to another. For example, the total power output of an access node can be based on a maximum transmit power of a channel and an amount of antennae. Handovers may be triggered based on a combination of the pairing efficiency metric and the total power output. A power output threshold may be operator configurable, and depending on a number of antennas in use, available channel bandwidth, etc.

Access node 110 can be any network node configured to provide communication between wireless devices 120, 130 and communication network 101, including standard access nodes such as a macro-cell access node, base transceiver station, a radio base station, an eNodeB device, an enhanced eNodeB device, an a next generation or gigabit NodeB device (gNodeB) in 5G networks, or the like. In an exemplary embodiment, a macro-cell access node can have a coverage area in the range of approximately five kilometers to thirty-five kilometers and an output power in the tens of watts. Alternatively, access node 110 may comprise any short range, low power, small-cell access nodes such as a microcell access node, a picocell access node, a femtocell access node, or a home eNodeB/gNodeB device.

Access node 110 can comprise a processor and associated circuitry to execute or direct the execution of computer-readable instructions to perform operations such as those further described herein. Briefly, access node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 can receive instructions and other input at a user interface. Access node 110 communicates with gateway node 102 and controller node 104 via communication links 106, 107. Access node 110 may communicate with each other, and other access nodes (not shown), using a wireless link or a wired link such as an X2 link. Components of exemplary access node 110 and processing nodes coupled thereto are further described with reference to FIGS. 2-3.

Wireless devices 120, 130 may be any device, system, combination of devices, or other such communication platform capable of communicating wirelessly with access node 110 using one or more frequency bands deployed therefrom. Each of wireless devices 120, 130 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can send and receive audio or data. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 120-140. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. Communication links 106, 107 may include S1 communication links. Other wireless protocols can also be used. Communication links 106, 107 can be a direct link or might include various equipment, intermediate components, systems, and networks. Communication links 106, 107 may comprise many different signals sharing the same link.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) or 5G NR, and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR, and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to components of system 100, such as load information of access node 110 and carriers deployed therefrom, pairing efficiency metrics of each carrier, capabilities and pairing eligibility of wireless devices 120, 130, and so on. This information may be requested by or shared with access node 110 via communication links 106, 107, X2 connections, and so on. The software comprises computer programs, firmware, or some other form of machine-readable instructions, and may include an operating system, utilities, drivers, network interfaces, applications, or some other type of software, and combinations thereof. For example, a processing node within controller node 104 can perform the operations described herein. Further, controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Further, the methods, systems, devices, networks, access nodes, and equipment described herein may be implemented with, contain, or be executed by one or more computer systems and/or processing nodes. The methods described above may also be stored on a non-transitory computer readable medium. Many of the elements of communication systems 100 may be, comprise, or include computers systems and/or processing nodes. This includes, but is not limited to: access node 110, controller node 104, and/or networks 101, 201.

Figure 2:
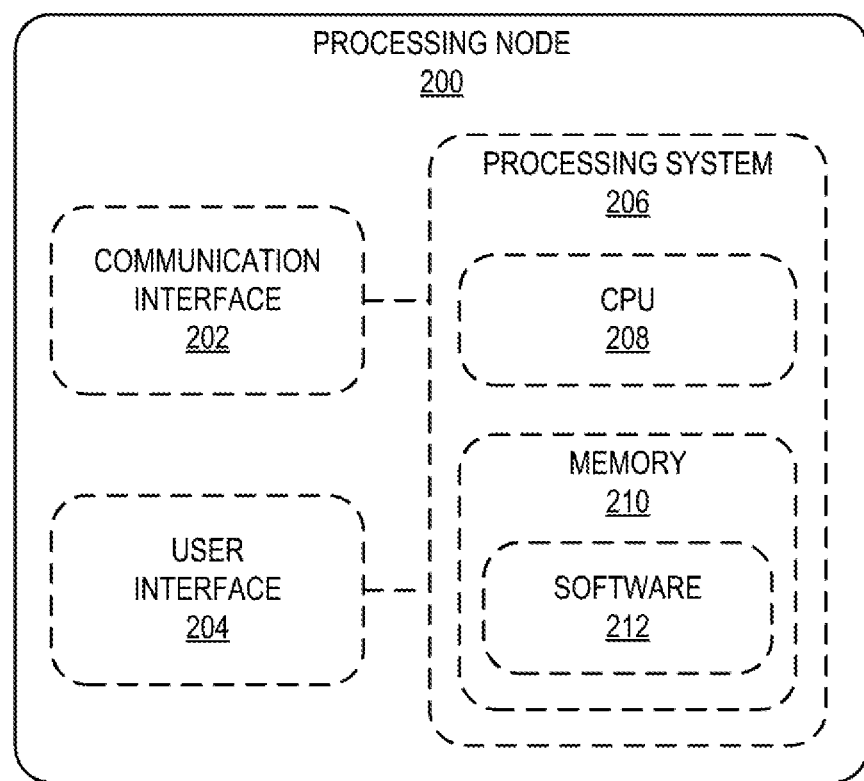
FIG. 2 depicts an exemplary processing node for load balancing based on pairing efficiency.

FIG. 2 depicts an exemplary processing node 200. Processing node 200 comprises a communication interface 202, user interface 204, and processing system 206 in communication with communication interface 202 and user interface 204. Processing system 206 includes a central processing unit (CPU) 208, and a memory 210, which can comprise a disk drive, flash drive, memory circuitry, or other memory device. Memory 210 can store computer programs, firmware, or some other form of machine-readable instructions, including an operating system, utilities, drivers, network interfaces, applications, or some other type of software. Further, memory 210 can store a software 212, which may be executed to perform the operations described herein. Processing system 206 may include other circuitry to retrieve and execute software 212 from memory 210. Processing node 200 may further include other components such as a power management unit, a control interface unit, etc., which are omitted for clarity. Communication interface 202 permits processing node 200 to communicate with other network elements. User interface 204 permits the configuration and control of the operation of processing node 200.

In an exemplary embodiment, software 212 can include instructions for comparing a pairing efficiency metric of different carriers within a wireless sector, and based on the comparing, triggering handovers of wireless devices from one carrier to another carrier. Triggering handovers can include adjusting a reference signal transmit power associated with each different carrier. Further, the pairing efficiency metric can be based on an eligibility of wireless devices to join or form MU-MIMO groups in each carrier. For example, the pairing eligibility can be based on one or more criteria including any combination of: an orthogonality of wireless devices in each carrier, an angular separation of wireless devices in each carrier, or a threshold data buffer requirement. In an exemplary embodiment, the pairing efficiency metric comprises a percentage quantity of wireless devices in each carrier that are eligible to join or form the MU-MIMO groups. Further, the different carriers can be deployed by a colocated access node, e.g. an access node that is configured to deploy a first carrier using a $4^{th}$ generation long-term evolution (4G-LTE) wireless air interface, and a second carrier using a $5^{th}$ generation new radio (5G-NR) wireless air interface. Based on the comparing, if it is determined that the pairing efficiency metric of the first carrier is higher than the pairing efficiency metric of the second carrier, handovers are triggered of wireless devices from the second carrier to the first carrier. Triggering handovers of wireless devices from the second carrier to the first carrier can include one or both of increasing a reference signal transmit power of the first carrier, or reducing a reference signal transmit power of the second carrier. Further, if it is determined (based on the comparing) that the pairing efficiency metric of the second carrier is higher than the pairing efficiency metric of the first carrier, then handovers can be triggered of wireless devices from the first carrier to the second carrier. Triggering handovers of wireless devices from the first carrier to the second carrier can include one or both of increasing a reference signal transmit power of the second carrier, or reducing a reference signal transmit power of the first carrier. Further, a total power output of each carrier can be considered such that triggering handovers is based on a combination of the pairing efficiency metric and the total power output.

Figure 3:
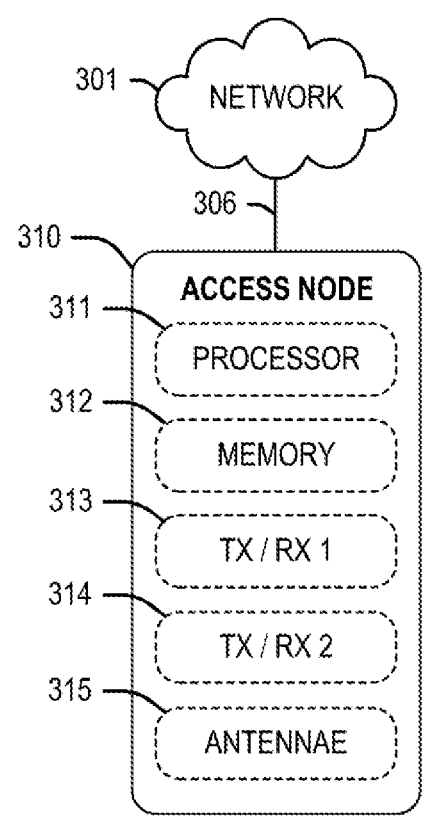
FIG. 3 depicts an exemplary access node for load balancing based on pairing efficiency.

FIG. 3 depicts an exemplary access node 310. Access node 310 may comprise, for example, a macro-cell access node, such as access node 110 described with reference to FIG. 1. Access node 310 is illustrated as comprising a processor 311, memory 312, first transceiver 313, second transceiver 314, and antennae 315. Processor 311 executes instructions stored on memory 312, and transceivers 313 and 314 (in conjunction with antennae 315) enable wireless communication respectively using a first RAT (e.g. 4G LTE) and a second RAT (e.g. 5G NR). Thus, access node 310 may be determined as being capable of communicating using both 4G LTE and 5G NR. For example, access node 310 may be configured to transmit control information using the 4G LTE transceiver 313 and data information using the 5G NR transceiver 314. Further, antenna elements 315 may include an array of antenna elements that are configured to deploy a radio air interface over one or more wireless sectors, form beams within these sectors, employ multiple-input-multiple-output (MIMO), etc.

Exemplary instructions stored on memory 312 can include instructions for determining whether or not wireless devices attached to access node 310 are capable of communicating using both RATs, and instruct the access node 310 to broadcast an indicator in, for example, a system information message. For example, access node 310 may use the 4G carrier to control and set up a dual connectivity session with the wireless devices. In other words, control information (including SIB messages) is transmitted from the access node 310 using the 4G carrier, while the 5G carrier is utilized for transmission of data. Further, memory 312 can include instructions for comparing a pairing efficiency metric of different carriers within a wireless sector, and based on the comparing, triggering handovers of wireless devices from one carrier to another carrier. Triggering handovers can include adjusting a reference signal transmit power associated with each different carrier. Further, the pairing efficiency metric can be based on an eligibility of wireless devices to join or form MU-MIMO groups in each carrier. For example, the pairing eligibility can be based on one or more criteria including any combination of: an orthogonality of wireless devices in each carrier, an angular separation of wireless devices in each carrier, or a threshold data buffer requirement. In an exemplary embodiment, the pairing efficiency metric comprises a percentage quantity of wireless devices in each carrier that are eligible to join or form the MU-MIMO groups. Further, the different carriers can be deployed by a colocated access node, e.g. an access node that is configured to deploy a first carrier using a $4^{th}$ generation long-term evolution (4G-LTE) wireless air interface, and a second carrier using a $5^{th}$ generation new radio (5G-NR) wireless air interface. Based on the comparing, if it is determined that the pairing efficiency metric of the first carrier is higher than the pairing efficiency metric of the second carrier, handovers are triggered of wireless devices from the second carrier to the first carrier. Triggering handovers of wireless devices from the second carrier to the first carrier can include one or both of increasing a reference signal transmit power of the first carrier, or reducing a reference signal transmit power of the second carrier. Further, if it is determined (based on the comparing) that the pairing efficiency metric of the second carrier is higher than the pairing efficiency metric of the first carrier, then handovers can be triggered of wireless devices from the first carrier to the second carrier. Triggering handovers of wireless devices from the first carrier to the second carrier can include one or both of increasing a reference signal transmit power of the second carrier, or reducing a reference signal transmit power of the first carrier. Further, a total power output of each carrier can be considered such that triggering handovers is based on a combination of the pairing efficiency metric and the total power output.

Figure 4:
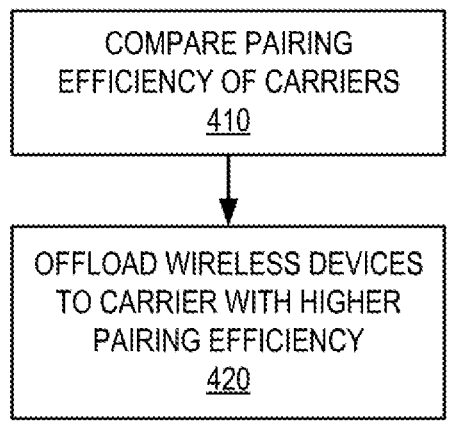
FIG. 4 depicts an exemplary method for load balancing based on pairing efficiency.

FIG. 4 depicts an exemplary method for load balancing based on pairing efficiency. The method of FIG. 4 may be implemented by a processing node communicatively coupled to one or more access nodes, controller nodes, or any other network node. Although FIG. 4 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 410, a pairing efficiency of two or more carriers is compared. The two or more carriers may be deployed by a colocated access node such as an access node configured to deploy carriers using at least two RATs (i.e. wireless air interfaces), e.g. a 4G LTE wireless air interface, and a 5G NR wireless air interface. Each RAT may be configured to utilize a different frequency band or sub-band, a different channel size or bandwidth, and so on. For example, the 5G NR carrier may be configured to utilize higher frequencies and larger channel bandwidths than the 4G LTE carrier. Further, the access node is configured to utilize 5G EN-DC, dual connections are initiated with one or more wireless devices using both 4G and 5G carriers, the 4G carrier being used to transmit control information, and the 5G carrier being used to transmit data information. Further, the pairing efficiency metric may be based on any combination of an orthogonality associated with the wireless devices attached to the access node, an angular separation required for MIMO pairing for the wireless devices, a threshold data buffer requirement of a buffer on the access node, or a number of wireless devices that is eligible to join a MU-MIMO group. Thus, the pairing efficiency metric can be based on performance of MIMO streams on each carrier, or any other criteria associated with the wireless device. For example, the pairing efficiency metric can be based on one or more of a size of each MIMO group comprising the eligible wireless devices, a quantity of eligible wireless devices participating in the MIMO groups, a percentage of total wireless devices attached to the access node, a throughput of each of the one or more MIMO groups in the sector, an average throughput of each MIMO group or each wireless device in each MIMO group, or an aggregate throughput (i.e. total throughput) of all MIMO signals within the sector. Performance metrics and/or pairing efficiency can further be based on historical and/or current information related to a quantity of successful pairings, trends of the signal characteristics, and so on. For example, the historical trends may be monitored and recorded at time intervals, and the pairing efficiency based on the recorded historical trends. Thus, at certain time intervals, the pairing efficiency is monitored when adjusting the MIMO criteria as described herein. Generally, the pairing efficiency tracks how successfully and efficiently the MIMO groups are utilizing the available resources. In an exemplary embodiment, the pairing efficiency metric is based on a ratio of a number of wireless devices qualifying for MU-MIMO on each carrier versus a total number of wireless devices attached to each carrier.

At 420, wireless devices are offloaded between carriers based on the pairing efficiency determined for each carrier. For example, when the pairing efficiency metric of a first carrier is higher than the pairing efficiency metric of a second carrier, handovers can be triggered of wireless devices from the first carrier to the second carrier. The resulting reduction in wireless devices in the first carrier frees up air interface resources (such as physical resource blocks) that would otherwise be used by wireless devices that were unable to participate in MIMO. Whereas, the increase in wireless devices in the second carrier would not negatively impact the amount of resources in the wireless air interface associated with the second carrier, because more wireless devices are able to use the same physical resource blocks (due to orthogonality), based on the higher pairing efficiency. Further, triggering handovers of wireless devices from the first carrier to the second carrier can be based on adjusting reference signal transmit powers of reference signals associated with each carrier. For example, upon increasing a reference signal transmit power of the second carrier and/or reducing a reference signal transmit power of the first carrier, wireless devices measuring both reference signals can request handovers to the second carrier. Further in exemplary embodiments, when the wireless devices are attached to both carriers using dual connectivity, the handover may be seamless, and wireless devices attached to the second carrier for control signaling can simply detach from the first carrier and start receiving data via the second carrier, or maintain attachment to the first carrier for control signaling while further attaching to the second carrier. In an exemplary embodiment, operations 410-420 are performed when the access node is loaded, or when the one of the carriers is loaded past a load threshold. Thus, the disclosed operations alleviate the load on the access node.

Figure 5:
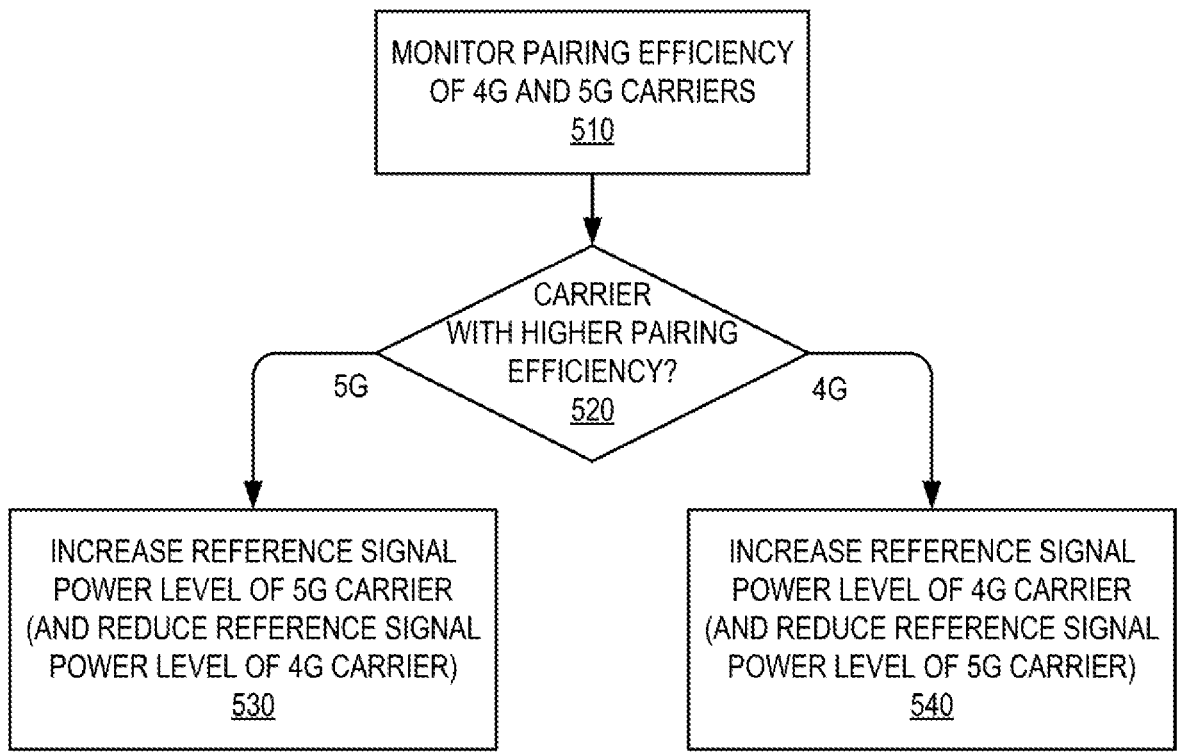
FIG. 5 depicts another exemplary method for load balancing based on pairing efficiency.

FIG. 5 depicts an exemplary method for load balancing based on pairing efficiency. The method of FIG. 5 may be implemented by a processing node communicatively coupled to one or more access nodes, controller nodes, or any other network node. Although FIG. 5 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 510, a pairing efficiency is monitored for wireless devices attached to an access node. The access node may be configured to deploy carriers using at least two RATs (i.e. wireless air interfaces), e.g. a 4G LTE wireless air interface, and a 5G NR wireless air interface. Each RAT may be configured to utilize a different frequency band or sub-band, a different channel size or bandwidth, and so on. For example, the 5G NR carrier may be configured to utilize higher frequencies and larger channel bandwidths than the 4G LTE carrier. Further, the access node is configured to utilize 5G EN-DC, dual connections are initiated with one or more wireless devices using both 4G and 5G carriers, the 4G carrier being used to transmit control information, and the 5G carrier being used to transmit data information. Further, the pairing efficiency metric may be based on any combination of an orthogonality associated with the wireless devices attached to the access node, an angular separation required for MIMO pairing for the wireless devices, a threshold data buffer requirement of a buffer on the access node, or a number of wireless devices that is eligible to join a MU-MIMO group. Thus, the pairing efficiency metric can be based on performance of MIMO streams, or any other criteria associated with the wireless device. For example, the pairing efficiency metric can be based on one or more of a size of each MIMO group comprising the eligible wireless devices, a quantity of eligible wireless devices participating in the MIMO groups, a percentage of total wireless devices attached to the access node, a throughput of each of the one or more MIMO groups in the sector, an average throughput of each MIMO group or each wireless device in each MIMO group, or an aggregate throughput (i.e. total throughput) of all MIMO signals within the sector. Performance metrics and/or pairing efficiency can further be based on historical and/or current information related to a quantity of successful pairings, trends of the signal characteristics, and so on. For example, the historical trends may be monitored and recorded at time intervals, and the pairing efficiency based on the recorded historical trends. Thus, at certain time intervals, the pairing efficiency is monitored when adjusting the MIMO criteria as described herein. Generally, the pairing efficiency tracks how successfully and efficiently the MIMO groups are utilizing the available resources. In an exemplary embodiment, the pairing efficiency metric is based on a ratio of a number of wireless devices qualifying for MU-MIMO on each carrier versus a total number of wireless devices attached to each carrier or to the access node.

At 520, the pairing efficiency of different carriers is compared to determine which carrier has the higher pairing efficiency, and at 530 and 540, wireless devices are offloaded based on the comparison. For example, when the pairing efficiency metric of a 4G carrier is higher than the pairing efficiency metric of a 5G carrier, handovers can be triggered of wireless devices from the 5G carrier to the 4G carrier at 540. The resulting reduction in wireless devices in the 5G carrier frees up air interface resources (such as physical resource blocks) that would otherwise be used by wireless devices that were unable to participate in MIMO. Whereas, the increase in wireless devices in the 4G carrier would not negatively impact the amount of resources in the 4G wireless air interface, because more wireless devices are able to use the same physical resource blocks (due to orthogonality), based on the higher pairing efficiency. Further, triggering handovers of wireless devices from the 5G carrier to the 4G carrier at 540 can be based on adjusting reference signal transmit powers of reference signals associated with each carrier. For example, upon increasing a reference signal transmit power of the 4G carrier and/or reducing a reference signal transmit power of the 5G carrier, wireless devices measuring both reference signals can request handovers to the 4G carrier. Further in exemplary embodiments, when the wireless devices are attached to both carriers using dual connectivity, the handover may be seamless, and wireless devices can simply detach from the 5G carrier and begin receiving data transmissions via the 4G carrier.

Further, when the pairing efficiency metric of the 5G carrier is higher than the pairing efficiency metric of the 4G carrier, handovers can be triggered of wireless devices from the 4G carrier to the 5G carrier. The resulting reduction in wireless devices in the 4G carrier frees up air interface resources (such as physical resource blocks) that would otherwise be used by wireless devices that were unable to participate in MIMO. Whereas, the increase in wireless devices in the 5G carrier would not negatively impact the amount of resources in the 5G wireless air interface, because more wireless devices are able to use the same physical resource blocks (due to orthogonality), based on the higher pairing efficiency. Further, triggering handovers of wireless devices from the 4G carrier to the 5G carrier can be based on adjusting reference signal transmit powers of reference signals associated with each carrier. For example, upon increasing a reference signal transmit power of the 5G carrier and/or reducing a reference signal transmit power of the 4G carrier, wireless devices measuring both reference signals can request handovers to the 5G carrier. Further in exemplary embodiments, when the wireless devices are attached to both carriers using dual connectivity, the handover may be seamless, remain connected to the 4G carrier for control signaling, and attach to the 5G carrier to begin receiving data therefrom.

Figure 6A:
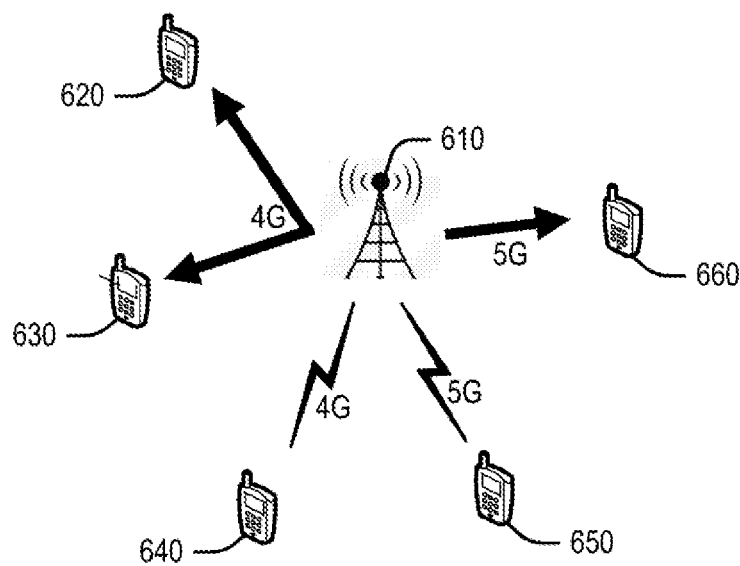
FIGS. 6A-6B depict exemplary configurations of load balancing based on pairing efficiency.
Figure 6B:
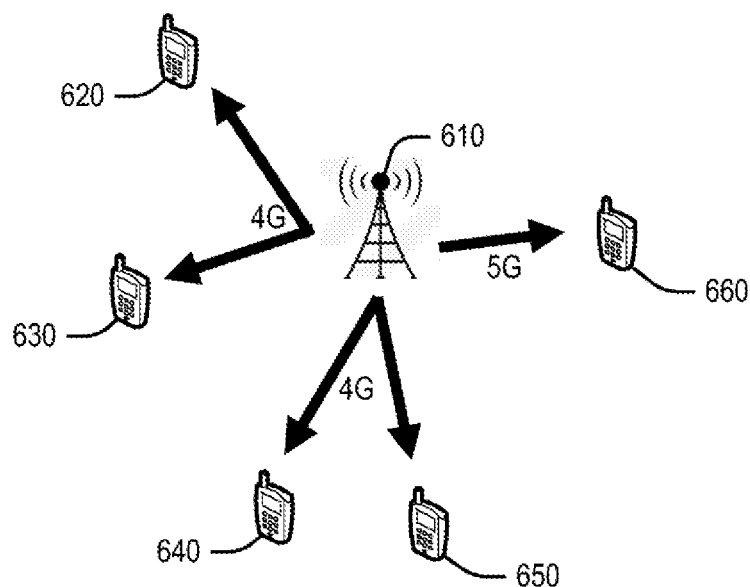

FIGS. 6A-6B depict exemplary load balancing scenarios based on a pairing efficiency of wireless devices in a sector. Access node 610 may be configured to deploy carriers using at least two RATs (i.e. wireless air interfaces), e.g. a 4G LTE wireless air interface, and a 5G NR wireless air interface. Each RAT may be configured to utilize a different frequency band or sub-band, a different channel size or bandwidth, and so on. For example, the 5G NR carrier may be configured to utilize higher frequencies and larger channel bandwidths than the 4G LTE carrier. For example, the 5G NR wireless air interface may utilize a first one or more frequency bands referred to here as F1, and the 4G LTE wireless air interface may utilize a second one or more frequency bands referred to here as F2. Further, access node 610 can be configured to communicate using both RATs at the same time. For example, access node 610 can comprise antennae that are configured to communicate with wireless devices 620, 630, and 640 via the 4G wireless air interface, and with wireless devices 650 and 660 via the 5G wireless air interface. For example, as shown herein with reference to FIG. 6A, wireless devices 620, 630 are illustrated as receiving a MU-MIMO data stream on the 4G carrier, wireless device 640 is illustrated as using a standard 4G communication link, wireless device 650 is illustrated as using a standard 5G communication link, and wireless device 660 is illustrated as receiving a SU-MIMO data stream on the 5G carrier.

Further, access node 610 may be configured to perform operations including comparing a pairing efficiency metric associated with each carrier, and offloading wireless devices between carriers based on the comparison. For example, it may be determined that the pairing efficiency metric of the 4G carrier is higher than that of the 5G carrier, based in part upon the fact that 2 out of 3 wireless devices on the 4G carrier are using MU-MIMO (that is, wireless devices 620 and 630), and that only one of two wireless devices on the 5G carrier is using MIMO (i.e. wireless device 660). Responsive to this determination, reference signals of each carrier may be adjusted to trigger handovers of wireless devices to the 4G carrier. Thus, with reference to FIG. 6B, wireless device 650 is now shown as attached to the 4G carrier. The resulting reduction in wireless devices in the 5G carrier frees up air interface resources (such as physical resource blocks) that would otherwise be used by wireless device 650 that was unable to participate in MIMO. Whereas, the increase in wireless devices in the 4G carrier does not negatively impact the amount of resources in the 4G wireless air interface, because more wireless devices are able to use the same physical resource blocks (due to orthogonality), based on the higher pairing efficiency. For example, wireless devices 640 and 650 may participate in MU-MIMO based on the increased pairing efficiency. Further, triggering handovers of wireless devices from the 5G carrier to the 4G carrier can be based on adjusting reference signal transmit powers of reference signals associated with each carrier. For example, upon increasing a reference signal transmit power of the 4G carrier and/or reducing a reference signal transmit power of the 5G carrier, wireless devices measuring both reference signals can request handovers to the 4G carrier. Further in exemplary embodiments, when the wireless devices are attached to both carriers using dual connectivity, the handover may be seamless, and wireless devices can simply detach from the 5G carrier and begin receiving data transmissions via the 4G carrier.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for load balancing based on pairing efficiency, the method comprising:
   comparing a pairing efficiency metric of different carriers within a wireless sector, wherein the different carriers comprise at least a first carrier using a first radio access technology (RAT) and a second carrier using a second RAT;
   determining, based on the comparing, that the pairing efficiency metric of the first carrier is higher than the pairing efficiency metric of the second carrier; and
   triggering handovers of wireless devices from the second carrier to the first carrier;
   wherein triggering handovers comprises one or both of increasing a reference signal transmit power of the first carrier, or reducing a reference signal transmit power of the second carrier.

2. The method of claim 1, wherein the pairing efficiency metric is based on an eligibility of wireless devices to join or form MU-MIMO groups in each carrier.

3. The method of claim 2, wherein the eligibility is based on one or more criteria including any combination of: an orthogonality of wireless devices in each carrier, an angular separation of wireless devices in each carrier, or a threshold data buffer requirement.

4. The method of claim 2, wherein the pairing efficiency metric comprises a percentage quantity of wireless devices in each carrier that are eligible to join or form the MU-MIMO groups.

5. The method of claim 1, wherein the different carriers are deployed by a colocated access node.

6. The method of claim 1, wherein the first RAT comprises $4^{th}$ generation long-term evolution (4G-LTE), and the second RAT comprises $5^{th}$ generation new radio (5G-NR).

7. The method of claim 1, further comprising:
   determining, based on the comparing, that the pairing efficiency metric of the second carrier is higher than the pairing efficiency metric of the first carrier; and
   triggering handovers of wireless devices from the first carrier to the second carrier.

8. The method of claim 7, wherein triggering handovers of wireless devices from the first carrier to the second carrier comprises one or both of:
   increasing a reference signal transmit power of the second carrier, or
   reducing a reference signal transmit power of the first carrier.

9. The method of claim 1, further comprising:
   comparing a total power output of each carrier; and
   triggering handovers based on a combination of the pairing efficiency metric and the total power output.

10. A system for load balancing based on pairing efficiency, the system comprising:
    an access node configured to deploy at least a first carrier using a first radio access technology (RAT) and a second carrier using a second RAT; and
    a processing node coupled to the access node, the processing node being configured to perform operations comprising:
       comparing a pairing efficiency metric of each carrier;
       determining, based on the comparing, that the pairing efficiency metric of the first carrier is higher than the pairing efficiency metric of the second carrier; and
       offloading wireless devices from the second carrier to the first carrier,
       wherein offloading wireless devices comprises one or both of increasing a reference signal transmit power of the first carrier, or reducing a reference signal transmit power of the second carrier.

11. The system of claim 10, wherein:
the first RAT comprises 5$^{th}$ generation new radio (5G-NR), and
the second RAT comprises 4$^{th}$ generation long-term evolution (4G-LTE).

12. The system of claim 10, wherein the pairing efficiency metric is based on an eligibility of wireless devices to join or form MU-MIMO groups in each carrier.

13. A processing node for load balancing based on pairing efficiency, the processing node being configured to perform operations comprising:
comparing a pairing efficiency metric of different carriers within a wireless sector, wherein the different carriers comprise at least a first carrier using a first radio access technology (RAT), and a second carrier using a second RAT;
determining, based on the comparing, that the pairing efficiency metric of the first carrier is higher than the pairing efficiency metric of the second carrier; and
triggering handovers of wireless devices from the second carrier to the first carrier;
wherein triggering handovers comprises one or both of increasing a reference signal transmit power of the first carrier, or reducing a reference signal transmit power of the second carrier.

14. The processing node of claim 13, wherein the pairing efficiency metric is based on an eligibility of wireless devices to join or form MU-MIMO groups in each carrier.

15. The processing node of claim 14, wherein the eligibility is based on one or more criteria including any combination of: an orthogonality of wireless devices in each carrier, an angular separation of wireless devices in each carrier, or a threshold data buffer requirement.

* * * * *